(12) United States Patent
Guan et al.

(10) Patent No.: US 8,252,366 B2
(45) Date of Patent: Aug. 28, 2012

(54) METHOD FOR MAKING TOUGHENED ELECTRODE-SUPPORTED CERAMIC FUEL CELLS

(75) Inventors: Jie Guan, Torrance, CA (US); Gregory R. Lear, Madison, NJ (US); Matthew Walker, Redondo Beach, CA (US)

(73) Assignee: General Electric Company, Schenectady, NY (US)

( * ) Notice: Subject to any disclaimer, the term of this patent is extended or adjusted under 35 U.S.C. 154(b) by 245 days.

(21) Appl. No.: 12/472,890

(22) Filed: May 27, 2009

(65) Prior Publication Data

US 2009/0232973 A1     Sep. 17, 2009

Related U.S. Application Data

(62) Division of application No. 11/278,212, filed on Mar. 31, 2006.

(51) Int. Cl.
*B05D 5/12*     (2006.01)
*B05D 3/00*     (2006.01)

(52) U.S. Cl. ........ 427/115; 427/256; 427/282; 427/355; 427/383.1; 427/421.1

(58) Field of Classification Search ................ 427/115, 427/256, 282, 355, 383.1, 421.1
See application file for complete search history.

(56) References Cited

U.S. PATENT DOCUMENTS

| | | |
|---|---|---|
| 5,922,486 A | 7/1999 | Chiao |
| 6,228,521 B1 | 5/2001 | Kim et al. |
| 6,270,536 B1 | 8/2001 | Minh et al. |
| 6,395,337 B1 | 5/2002 | Benzama et al. |
| 6,663,999 B2 | 12/2003 | Van Berkel et al. |
| 6,994,884 B1 | 2/2006 | Guan et al. |
| 7,351,491 B2 | 4/2008 | Sprenkle et al. |
| 2004/0115503 A1* | 6/2004 | Jacobson et al. ............ 429/34 |
| 2007/0054169 A1* | 3/2007 | Day et al. ............ 429/30 |

FOREIGN PATENT DOCUMENTS

GB     2400723 A     10/2004

OTHER PUBLICATIONS

Harmer, et al., "Unique Opportunities for Microstructural Engineering with Duplex and Laminar Ceramic Composites," J. Am. Ceram. Soc., 75(7) p. 1715-28 (1992).

\* cited by examiner

*Primary Examiner* — Brian K Talbot
(74) *Attorney, Agent, or Firm* — Sutherland Asbill & Brennan LLP

(57) ABSTRACT

A solid oxide electrochemical device having a laminar composite electrode with improved electrochemical and mechanical performance, the laminar composite electrode comprising a porous support electrode layer, a thin and patterned structure layer, and a thin and dense electrolyte layer and methods for making.

16 Claims, 3 Drawing Sheets

METHOD FOR MAKING TOUGHENED ELECTRODE-SUPPORTED CERAMIC FUEL CELLS

CROSS REFERENCE TO RELATED APPLICATIONS

This is a divisional of U.S. patent application Ser. No. 11/278,212 filed with the U.S. Patent and Trademark Office on Mar. 31, 2006.

FIELD OF INVENTION

This invention relates to solid oxide electrochemical devices. In particular, this invention relates to solid oxide electrochemical devices having an electrode-support with improved structural properties.

BACKGROUND OF INVENTION

Solid oxide electrochemical devices have demonstrated great potential for future power generation with high efficiency and low emission. Such solid oxide electrochemical devices include solid oxide fuel cells (SOFCs) for power generation and solid oxide electrolyzers for chemical (e.g. $H_2$, $O_2$, and CO) production.

In an SOFC, stacks of fuel cells, each of which is capable of generating a small amount of power, are connected together. Each cell is connected to its neighboring cell with an interconnect, which serves as both a current collector and a channel for flowing gases to the electrodes. Two basic cell constructions are used for SOFCs: electrolyte-supported cells and electrode-supported cells. In electrode-supported cells, the support electrode functions include electrical flow path, mass transport path, and mechanical support. To satisfy these functions, the support-electrode must have sufficient conductive components, porosity, and strength.

Typical support-electrodes must be considerably thick to provide the required mechanical strength and handling ability. In electrode-supported cell fabrication, the differences in sintering densification behavior and coefficient of thermal expansion (CTE) of the electrode and electrolyte components result in non-flatness (such as camber shape and edge ripples) of the cell. Generally, as support electrode thickness increases, the cell cambering tends to be reduced. The low mechanical strength and cell non-flatness in electrode-supported cells can lead to cell fracture in fabrication, stack assembly, and operation. While mechanical strength and cell flatness favor a thick support electrode, thick support-electrodes can restrict mass transport through the electrodes by limiting the oxygen transport in the support cathode or fuel/product transport in the support anode. The limitations in mass transport will lead to lower cell/stack performance, especially at high reactant utilizations for high efficiency. One approach to improve mass transport through the thick electrode is to increase porosity; however, the mechanical strength of the electrode will be compromised by too much porosity.

Previous attempts to address these problems have fallen short. For example, use of a composition gradient permits use of thicker and better performing anodes; however, the CTE mismatch between NiO and zirconia creates challenges in fabricating large, flat electrode-supported cells. The large volume of Ni in the anode after reduction could also result in creeping and sintering of the anode under the high operating temperatures of SOFCs.

An alternative structure is to form a continuous three-dimensional network with many microcomposite NiO and zirconia subelements in patterns. The network improves the electrical connectivity and increases the strength of the overall structure; however, effectively controlling the desired order of the subelements is difficult as they are vulnerable to distortion forces in the fabrication process.

Although these efforts show promise in improving the electrochemical and mechanical performance of electrode-supported cells, problems still remain. Accordingly, there is a need for an electrode-supported cell with improved electrochemical and mechanical performance.

SUMMARY OF INVENTION

This invention addresses the above-described need by providing an electrode-supported electrochemical device comprising a laminar composite electrode and a second electrode. The laminar composite electrode comprises a porous support electrode, a thin and patterned structure layer, and a thin and dense electrolyte, wherein the thin and dense electrolyte is adjacent to a first side of the porous support electrode and the thin and patterned structure layer is adjacent to a second side of the porous support electrode, and a second electrode adjacent the thin and dense electrolyte of the laminar composite electrode to form a complete cell.

In addition, this invention encompasses a method for making an electrode-supported electrochemical device comprising fabricating a laminar composite electrode comprising a porous support electrode, a thin and patterned structure layer, and a thin and dense electrolyte, co-firing the laminar composite electrode, and fabricating a second electrode on the surface of the dense electrolyte.

Other objects, features, and advantages of this invention will be apparent from the following detailed description, drawings, and claims.

DETAILED DESCRIPTION OF INVENTION

As summarized above, this invention encompasses an electrode-supported electrochemical device with improved electrochemical and mechanical performance. Embodiments of this invention are described in detail below and illustrated in FIGS. 1-3.

Figure 1:
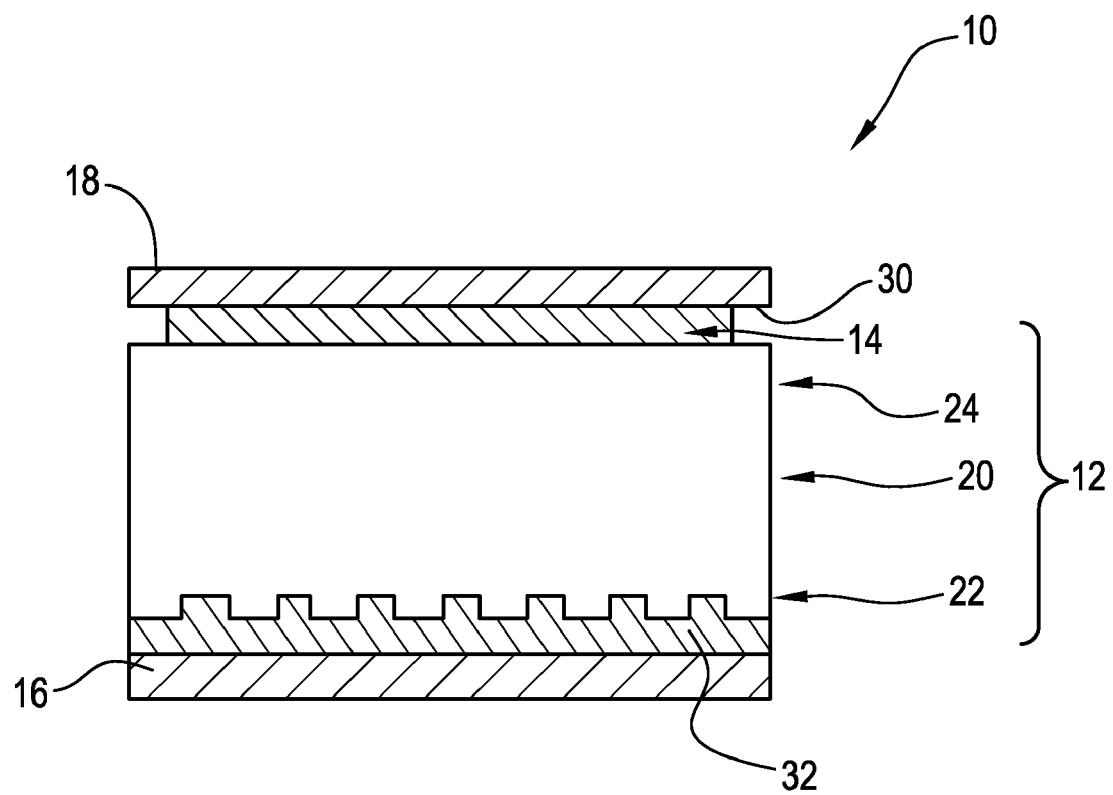
FIG. 1 is a perspective view of an electrode-supported electrochemical device having a laminar composite electrode in accordance with an embodiment of this invention.

A single solid oxide electrochemical device 10 having improved electrochemical and mechanical performance made in accordance with an embodiment of this invention is illustrated in FIG. 1. More particularly, the solid oxide electrochemical device 10 in FIG. 1 is an SOFC, but it should be understood that this invention also encompasses solid oxide electrolyzers and solid oxide electrochemical pumps. Generally, the solid oxide electrochemical device 10 comprises an laminar composite electrode 12, a second electrode 14, and first and second metallic interconnects 16 and 18. The metallic interconnects 16 and 18 typically function as current collectors as well as a channel to form the desired flow fields.

The laminar composite electrode 12, illustrated in FIG. 1, comprises a porous support electrode 20, a thin patterned structural layer 22, and a dense and thin electrolyte 24. The electrolyte 24 is on a first side of the porous support electrode 20 while the patterned structural layer 22 is on a second side of the porous support electrode 20. The porous support electrode 20 preferably has a thickness in the range of about 100 microns to about 3000 microns. The dense, thin electrolyte 24 preferably has a thickness in the range of about 5 microns to about 40 microns.

The porous support electrode 20 is comprised of either a cathode or an anode. In an embodiment, cathode materials are selected from the group consisting of lanthanum strontium manganites (LSM), praseodymium strontium manganites (PSM), lanthanum strontium ferrites (LSF), lanthanum strontium cobaltites (LSC), manganese-(Co, Cr, Ni) spinels, and a conductive pervoskite in the general form of $ABO_3$, where A comprises at least one of the elements selected from the group consisting of La, Ce, Pr, Sr, Ca, and Ba; and B comprises at least one of the elements selected from the group consisting of Mn, Fe, Co, Ni, Cu, and Zn. The cathode materials may comprise a single phase or a composite with a ionic conductor such as doped zirconia or doped ceria. In an embodiment, the anode materials are selected from the group consisting of nickel cermet, copper/ceria cermet, and conducting ceramics. Nickel cermets include nickel/yttria-stabilized zirconia (YSZ), nickel/ceria, and nickel/Scandia-stabilized zirconia. Conducting ceramics include doped (La, Sr)$TiO_3$, doped ceria, doped $LaNiO_3$, doped $LaCrO_3$, and doped niobates. Other cathode and anode materials may also be used and are known to those skilled in the art.

The dense, thin electrolyte 24 of the laminar composite electrode 12 comprises a material selected from the group consisting of doped zirconia, doped ceria, doped lanthanum gallate, and doped Ba(Sr)Ce(Zr)$O_3$, although other electrolyte materials may also be used. Such electrolyte materials are well known to those skilled in the art.

Figure 2:
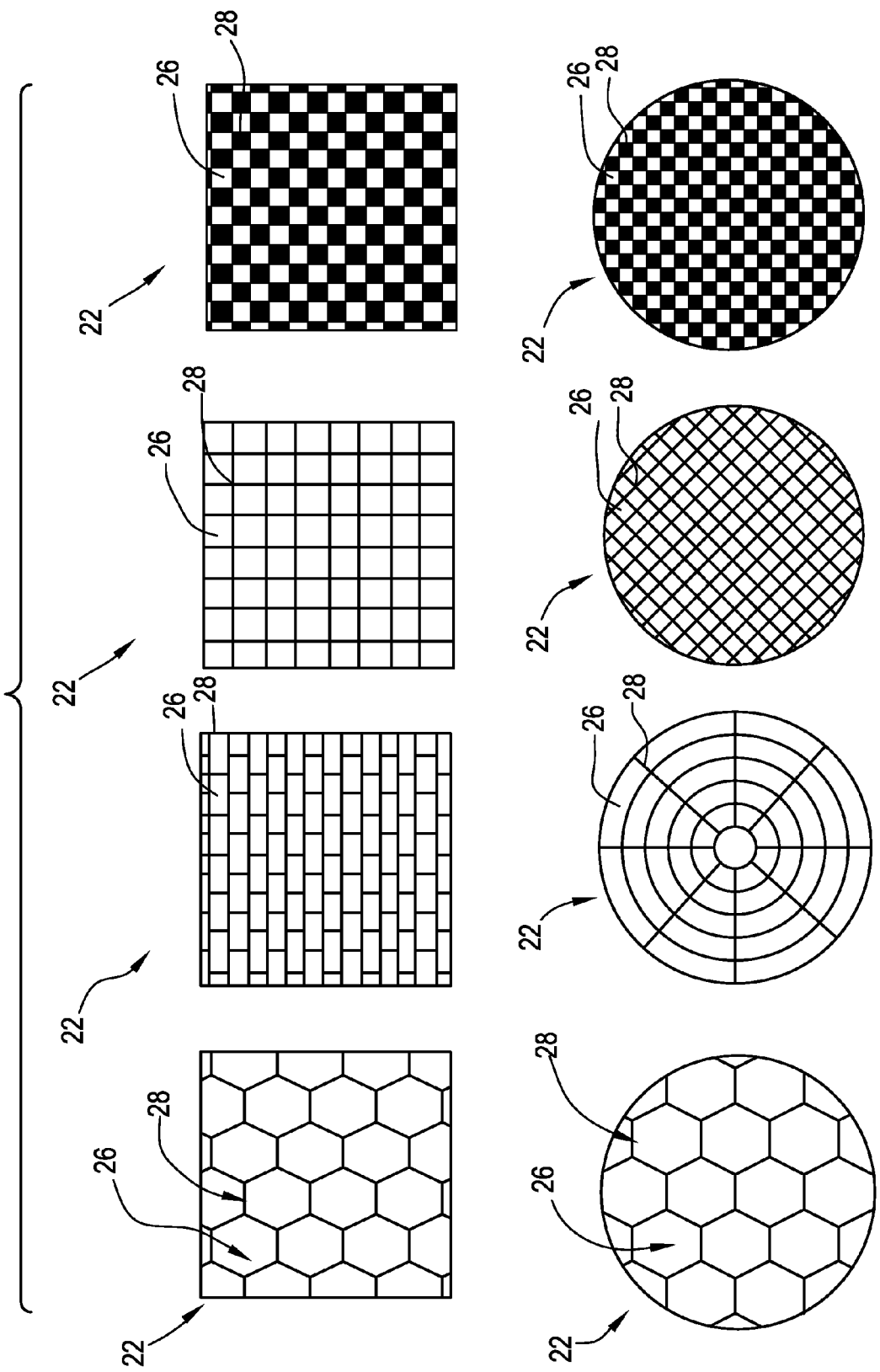
FIG. 2 is a partial plan view of patterned structural layers in accordance with an embodiment of this invention.

The thin, patterned structural layer 22 of the laminar composite electrode 12 functions as a frame to strengthen the solid oxide electrochemical device 10 and keeps the solid oxide electrochemical device 10 flat during sintering and operation. The thin, patterned structural layer 22 has a pattern structured for providing a desired or predetermined mass transport and electrical flow path through the porous support-electrode 20. Examples of patterns are illustrated in FIG. 2. As shown in FIG. 2, open areas 26 without coverage by the patterned structural layer 22 keep the mass and electrical flow paths toward the porous support-electrode 20. The land areas 28 with coverage by the patterned structural layer 22 form an interweaved structure or an array of open areas defined by land areas. The thin, patterned structural layer 22 desirably has material properties similar to the electrolyte 24, creating a "symmetric" laminar composite electrode 12. The material properties that are desirably similar include composition, morphology, sintering behavior, and thermal expansion coefficients. Such materials are selected from the group consisting of doped zirconia, doped ceria, doped lanthanum gallate, doped Ba(Sr)Ce(Zr)$O_3$, $TiO_2$, $Al_2O_3$, $MnO_x$, MgO, and NiO. It is also desirable that the thin, patterned structural layer 22 have a thickness similar to the electrolyte layer 24 (desirably from about 1 micron to about 40 microns).

The second electrode 14 comprises either a cathode or an anode, depending on the composition of the laminar composite electrode 12. When the laminar composite electrode 12 comprises a cathode, the second electrode 14 comprises an anode. Conversely, when the laminar composite electrode 12 comprises an anode, the second electrode 14 comprises a cathode. In an embodiment, the second electrode 14 has a thickness in the range of about 10 microns to about 100 microns. The cathode materials are selected from the group consisting of lanthanum strontium manganites (LSM), praseodymium strontium manganites (PSM), lanthanum strontium ferrites (LSF), lanthanum strontium cobaltites (LSC), manganese-(Co, Cr, Ni) spinels, and a conductive pervoskite in the general form of $ABO_3$, where A comprises at least one of the elements selected from the group consisting of La, Ce, Pr, Sr, Ca, and Ba; and B comprises at least one of the elements selected from the group consisting of Mn, Fe, Co, Ni, Cu, and Zn. Cathode materials may comprise a single phase or a composite with ionic conductors such as doped zirconia or doped ceria. The anode materials are selected from the group consisting of nickel cermet, copper/ceria cermet, and conducting ceramics. Nickel cermets include nickel/YSZ, nickel/ceria, and nickel/scandia-stabilized zirconia. Conducting ceramics include doped (La, Sr)$TiO_3$, doped ceria, doped $LaNiO_3$, doped $LaCrO_3$, and doped niobates. Other cathode and anode materials may also be used and are known to those skilled in the art.

The metallic interconnects 16 and 18 are electrically connected to the electrodes. The metallic interconnects 16 and 18 preferably are made of electrically conducting materials such as a metal plate or metal foil. In an embodiment, the metallic interconnects 16 and 18 are made of metals such as SS446 (stainless steel), SS430 (stainless steel), AL453 (stainless steel), E-Brite (stainless steel) available from Allegheny Ludlum Corporation, Crofer 22 (Fe, Cr alloy) available from ThyssenKrupp VDM, or Fecralloy (Fe, Cr, Al alloy) available from Goodfellow. The laminar composite electrode 12 and second electrode 14 are disposed between the metallic interconnects 16 and 18 to form a complete solid oxide electrochemical device module as illustrated in FIG. 1, although it is understood that the solid oxide electrochemical device 10 can take other shapes. The metallic interconnects 16 and 18 connect the anode of one device to the cathode of a second device creating a stack.

The solid oxide electrochemical device 10 may also comprise contact agents 30 and 32 between the electrodes 12 and 14 and metallic interconnects 16 and 18 in a stack. The contacting agents 30 and 32 form an electrical path between the electrodes and the interconnects, thus forming electrical paths between cells in the stack. Contacting agents 30 and 32 comprise conducting metal/ceramic materials in the form of mesh, foam, felt, and paste.

Figure 3:
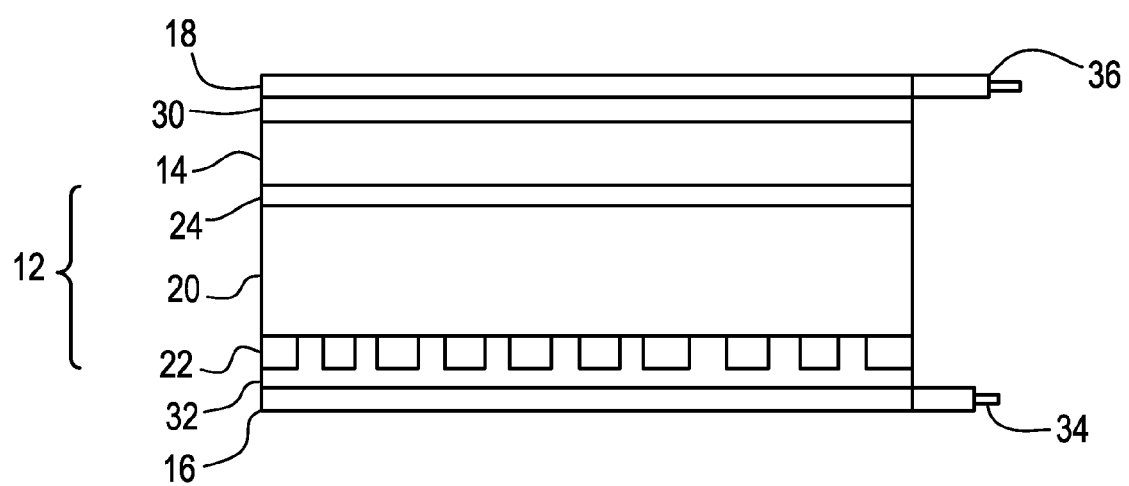
FIG. 3 is an elevation view of the embodiment in FIG. 1 illustrating operation of an electrode-supported electrochemical device.

FIG. 3 illustrates the solid oxide electrochemical device 10 of FIG. 1 in operation. In operation, the solid oxide electrochemical device 10 is equipped with a gas inlet 34 for feeding gas along the gas flow path between the laminar composite electrode 12 and metallic interconnect 16. The solid oxide electrochemical device 10 is also equipped with a second gas inlet 36 for feeding a second gas along a flow path between the second electrode 14 and metallic interconnect 18.

This invention also encompasses a method for making an electrode-supported solid oxide electrochemical device 10 with improved electrochemical and mechanical performance. A electrode-supported bilayer comprising a support electrode 20 and thin electrolyte 24 on a first side of the support electrode 20 is fabricated using processes known to those of skill in the art. Such techniques include dry processing, tape casting, tape calendaring, and screen-printing. A thin, patterned structural layer 22 is fabricated on the second side of the support electrode 20 using techniques known to those of skill in the art, including techniques such as screen-printing, spraying, and slurry coating. After being air-dried, the laminar composite electrode 12 is heated to burn out the organic and fired at a temperature appropriate for the materials. The second electrode 14 is fabricated on the thin electrolyte 24 using techniques known to those of skill in the art. Such techniques include screen-printing, spraying, and slurry coating. The entire cell is fired at a temperature appropriate for the materials to form an electrode-supported solid oxide electrochemical device 10.

The present invention is further illustrated by the following examples, which is not to be construed in any way as imposing limitations upon the scope thereof. On the contrary, it is to be clearly understood that resort may be had to various other embodiments, modifications, and equivalents thereof which, after reading the description therein, may suggestion themselves to those skilled in the art without departing from the spirit of the present invention and/or the scope of the appended claims.

EXAMPLE 1

A laminar composite electrode comprises an anode-supported bilayer tape. The anode-supported bilayer tape comprises a thick 8YSZ-NiO support anode and a thin YSZ electrolyte, made using processes known to those of skill in the art. An example of such a process is tape-calendaring. A thin 8YSZ, zirconia with $Al_2O_3$ addition, or 3YSZ structural pattern is screen-printed on the outer surface of the support anode at a thickness ranging from about 1 microns to about 7 microns and a width ranging from about 25 microns to about 125 microns. After being air-dried, the tape is heated to burn out the organic material and fired at a temperature of about 1300° C. to about 1400° C. A LSM/YSZ cathode is screen printed on the dense, thin YSZ electrolyte. The entire cell is fired at a temperature of about 1000° C. to about 1300° C. to form an electrode-supported solid oxide electrochemical device.

EXAMPLE 2

A laminar composite electrode comprises an anode-supported bilayer tape. The anode-supported bilayer tape comprises a thick ceria-NiO support anode and a thin ceria electrolyte, made using processes known to those of skill in the art. An example of such a process is tape-calendaring. A thin ceria structural pattern is screen-printed on the outer surface of the support anode at a thickness ranging from about 1 microns to about 7 microns and a width ranging from about 25 microns to about 125 microns. After being air-dried, the tape is heated to burn out the organic and fired at a temperature of about 1300° C. to about 1400° C. A lanthanum ferrite or lanthanum cobaltite cathode is screen printed on the dense, thin ceria electrolyte. The entire cell is fired at a temperature of about 900° C. to about 1200° C. to form an electrode-supported solid oxide electrochemical device.

EXAMPLE 3

A laminar composite electrode comprises an anode-supported bilayer tape. The anode-supported bilayer tape comprises a thick YSZ-NiO support anode and a thin YSZ electrolyte, made using processes known to those of skill in the art. An example of such a process is tape-calendaring. A thin YSZ/NiO (80%/20% weight ratio) structural pattern is screen-printed on the outer surface of the support anode at a thickness ranging from about 1 microns to about 7 microns and a width ranging from about 25 microns to about 125 microns. After being air-dried, the tape is heated to burn out the organic material and fired at a temperature of about 1300° C. to about 1400° C. A LSM/YSZ cathode is screen printed on the dense, thin YSZ electrolyte. The entire cell is fired at a temperature of about 1000° C. to about 1300° C. to form an electrode-supported solid oxide electrochemical device.

EXAMPLE 4

A laminar composite electrode comprises a cathode-supported bilayer tape. The cathode-supported bilayer tape comprises a thick cathode of YSZ-LSM and a thin YSZ electrolyte, made using processes known to those of skill in the art. An example of such a process is tape-calendaring. A thin YSZ structural pattern is screen-printed on the outer surface of the support cathode at a thickness ranging from about 1 microns to about 7 microns and a width ranging from about 25 microns to about 125 microns. After being air-dried, the tape is heated to burn out the organic material and fired at a temperature of about 1200° C. to about 1300° C. A NiO/YSZ anode is screen printed on the dense, thin YSZ electrolyte. The entire cell is fired at a temperature of about 1000° C. to about 1300° C. to form an electrode-supported solid oxide electrochemical device.

EXAMPLE 5

A YSZ-NiO anode is formed using a known process, such as tape-calendaring and tape casting, and fired at a moderate temperature of about 1000° C. to about 1200° C. to form a prefired anode. On a first side of the prefired anode a thin YSZ electrolyte layer with a thickness of approximately 10 microns is screen-printed and dried. On a second side of the prefired anode a thin YSZ structural pattern is screen-printed at a thickness ranging from about 1 microns to about 10 microns and a width ranging from about 25 microns to about 125 microns. After being air-dried, the assembly is heated and fired at a temperature of about 1200° C. to about 1400° C. A LSM/YSZ cathode is then screen-printed on the dense YSZ electrolyte layer surface. The entire cell is fired at a temperature of about 1000° C. to about 1300° C. to form an electrode-supported solid oxide electrochemical device.

It should be understood that the foregoing relates to particular embodiments of the present invention, and that numerous changes may be made therein without departing from the scope of the invention as defined from the following claims.

We claim:

1. The method of making an electrode-supported electrochemical device comprising the steps of:
    fabricating an electrode-supported bilayer comprising a porous support electrode and a thin and dense electrolyte adjacent to and contiguous with a first side of the porous support electrode;
    fabricating a thin and patterned structure layer having a thickness in the range of about 1 micron to about 40 microns onto a second side of the porous support electrode of the electrode-supported bilayer to produce a laminar composite electrode, wherein the fabricating comprises coating, spraying, or printing the thing and patterned structure layer;
    co-firing the laminar composite electrode; and
    fabricating a second electrode on top of the thin and dense electrolyte and opposite the porous support electrode.

2. The method of claim 1 wherein the thin and patterned structure layer has a pattern structured for providing a predetermined mass transport and electrical flow path through the porous support-electrode.

3. The method of claim 2 wherein the thin patterned structure layer comprises an array of land areas and open areas.

4. The method of claim 1 wherein the bilayer is fabricated in green stage by a technique selected from the group consisting of dry processing, tape casting, tape calendaring, and screen-printing.

5. The method of claim 1 wherein the step of fabricating the thin and patterned structure layer comprises a technique selected from the group consisting of screen-printing, spraying, and slurry coating.

6. The method of claim 5 wherein the step of fabricating the laminar composite electrode further comprises the steps of:
   air-drying the laminar composite electrode; and
   heating the laminar composite electrode.

7. The method of claim 1 further comprising electrically connecting a first metallic interconnect to the laminar composite electrode and a second metallic interconnect to the second electrode.

8. The method of claim 1 wherein the second electrode comprises a cathode and the porous support electrode comprises an anode.

9. The method of claim 1 wherein the porous support electrode has a thickness in the range of about 100 microns to about 3000 microns.

10. The method of claim 1 wherein the dense, thin electrolyte has a thickness in the range of about 5 microns to about 40 microns.

11. The method of claim 1 wherein the porous support electrode comprises a material selected from the group consisting of lanthanum strontium manganites, praseodymium strontium manganites, lanthanum strontium ferrites, lanthanum strontium cobaltites, manganese-(Co, Cr, Ni) spinels, and a conductive pervoskite in the general form of $ABO_3$, where A comprises at least one of the elements selected from the group consisting of La, Ce, Pr, Sr, Ca, and Ba; and B comprises at least one of the elements selected from the group consisting of Mn, Fe, Co, Ni, Cu, and Zn.

12. The method of claim 1 wherein the porous support electrode comprises a material selected from the group consisting of nickel cermet, copper/ceria cermet, and conducting ceramics.

13. The method of claim 1 wherein the electrolyte comprises a material selected from the group consisting of doped zirconia, doped ceria, doped lanthanum gallate, and doped $Ba(Sr)Ce(Zr)O_3$.

14. The method of claim 1 wherein the thin patterned structure layer comprises materials selected from the group consisting of doped zirconia, doped ceria, doped lanthanum gallate, doped $Ba(Sr)Ce(Zr)O_3$, $TiO_2$, $Al_2O_3$, $MnO_x$, $MgO$, and $NiO$.

15. The method of claim 7 wherein the first and second metallic interconnects are made of electrically conducting material and are electrically contacted with the first and second electrodes by conductive metal/ceramic materials in the form of a mesh, foam, felt, or paste.

16. The method of claim 1 wherein the second electrode comprises an anode and the porous support electrode comprises a cathode.

* * * * *